United States Patent Office 2,739,147
Patented Mar. 20, 1956

2,739,147

MONOMETHINE DYES CONTAINING A THIOBARBITURIC ACID NUCLEUS

Grafton H. Keyes, Rochester, N. Y., assignor to Eastman Kodak Company, Rochester, N. Y., a corporation of New Jersey No Drawing. Application November 14, 1951,
Serial No. 256,383

7 Claims. (Cl. 260—240.4)

This invention relates to new monomethine dyes containing a pyrrole nucleus and a thiobarbituric acid nucleus and a method for making such dyes.

The new dyes of my invention can be represented by the following general formula:

I.

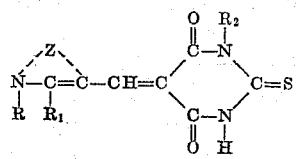

wherein R, $R_1$, and $R_2$ represents an alkyl group, such as methyl, ethyl, n-propyl, n-butyl, n-amyl, n-heptyl, n-decyl, n-dodecyl (lauryl), cyclohexyl, benzyl (phenylmethyl), etc., (especially a primary alkyl group of the formula $C_nH_{2n+1}$ wherein $n$ represents a positive integer of from 1 to 4) or an aryl group, such as phenyl, o-, m-, and p-tolyl, etc., (especially a mononuclear aryl group of the benzene series), and Z represents the non-metallic atoms necessary to complete a heterocyclic nucleus of the pyrrole series.

The monomethine dyes represented by Formula I above can be used to prepare filter layers and backing layers for photographic plates and film, and are characterized by high absorption properties and good bleachability by photographic processing bleaching baths. Dyes similar to those of Formula I, but wherein both nitrogen atoms of the barbituric acid nucleus are unsubstituted are not readily dispersible and hence frequently cause difficulty in the preparation of filter layers, while the corresponding disubstituted derivatives do not have sufficient affinity for the silver ion to be of practical use. The preparation of filter layers comprising the dyes of Formula I is described in Herz and Keyes U. S. application Serial No. 256,240, filed on even date herewith, now U. S. Patent 2,719,088, issued September 27, 1955.

The dyes represented by Formula I can advantageously be prepared by condensing an aldehyde selected from those represented by the following general formula:

II.

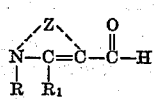

wherein R, $R_1$, and Z have the values set forth above, with a thiobarbituric acid selected from those represented by the following general formula:

III.

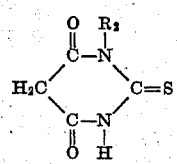

wherein $R_2$ has the values given above. The value for Z includes not only the simple pyrrole nucleus, but also condensed rings, such as the indole nucleus, the pyrrocoline nucleus, etc.

The condensations can be accelerated by heat and can be performed most advantageously by heating the reactants under reflux in an alcohol solution. The dyes can be separated from the reaction mixtures by chilling. They can then be recrystallized, if desired.

The following examples will serve to illustrate more fully the manner whereby I practice my invention.

Example 1.—5-[(2,5-dimethyl-1-phenyl-3-pyrryl)-methylene]-1-phenyl-2-thiobarbituric acid

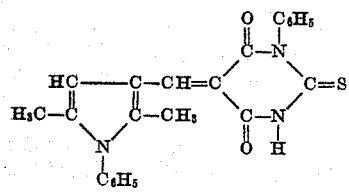

1-phenyl-2-thiobarbituric acid (2.1 g., 1 mol.), 2,5-dimethyl-1-phenylpyrrole-3-aldehyde (2 g., 1 mol.) and absolute ethyl alcohol (50 ml.) were refluxed for 15 minutes. Dye separated on chilling. The yield of crude well washed dye was 90% of theory. The dye was purified by dissolving in boiling pyridine, filtering while hot and then adding about 3 volumes of methyl alcohol and chilling. After two such treatments, a 60% yield of dye was obtained as brownish-yellow crystals, M. P. 247–250° C. with decomposition.

Anal. calcd. for $C_{23}H_{19}N_3O_2S$: C, 68.80; H, 4.77. Found, C, 69.2; H, 5.0.

1-phenyl-2-thiobarbituric acid has been described by T. Pavolini and F. Gambarin, Anal. chim. Acta., 3, 29 (1949).

Example 2.—5-[(1-cyclohexyl-2,5-dimethyl-3-pyrryl)-methylene]-1-phenyl-2-thiobarbituric acid

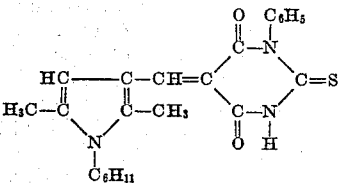

A mixture of 2.1 g. (1 mol.) of 1-phenyl-2-thiobarbituric acid, 2.05 g. (1 mol.) of 1-cyclohexyl-2,5-dimethylpyrrole-3-aldehyde and 50 ml. of absolute ethyl alcohol were heated under reflux for a 15-minute period. The yield of crude washed dye obtained was 83% of theory. After two recrystallizations the dye was obtained as brownish-yellow crystals, M. P. 270–272° C. dec.

Example 3.—5-[(2,5-dimethyl-1-n-propyl-3-pyrryl)methylene]-1-phenyl-2-thiobarbituric acid

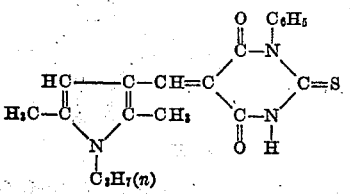

A mixture of 2.1 g. (1 mol.) of 1-phenyl-2-thiobarbituric acid, 1.65 g. (1 mol.) of 2,5-dimethyl-1-n-propylpyrrole-3-aldehyde and 50 ml. of absolute ethyl alcohol were refluxed together for 15 minutes. Yield of crude washed dye was 40% and after two recrystallizations the dye was obtained as brownish-yellow crystals, M. P. 282–284° C. dec.

Example 4.—5-[(1-lauryl-2,5-dimethyl-3-pyrryl)methylene]-1-phenyl-2-thiobarbituric acid

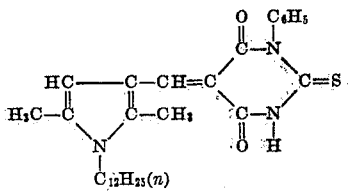

A mixture of 2.1 g. (1 mol.) of 1-phenyl-2-thiobarbituric acid, 2.9 g. (1 mol.) 1-lauryl-2,5-dimethylpyrrole-3-aldehyde (Example 2, U. S. Patent 2,298,731) and 50 ml. of absolute ethyl alcohol were refluxed together for 15 minutes. The yield of crude washed dye was 86% of theory and after two recrystallizations from a mixture of pyridine and methyl alcohol a 75% yield of dye was obtained as brownish-yellow crystals M. P. 186–188° C. dec.

Example 5.—5-[(2,5-dimethyl-1-phenyl-3-pyrryl)methylene]-1-ethyl-2-thiobarbituric acid

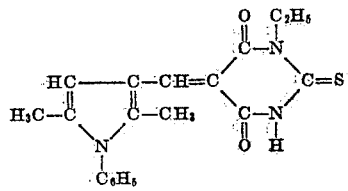

A mixture of 1.7 g. (1 mol.) of 1-ethyl-2-thiobarbituric acid, 2 g. (1 mol.) of 2,5-dimethyl-1-phenyl-pyrrole-3-aldehyde and 50 ml. of absolute ethyl alcohol were heated together under reflux for 15 minutes. The yield of well washed dye was 86% of theory. After two recrystallizations the dye was obtained as brownish-yellow crystals in 64% yield, M. P. 246–248° C. dec.

The 1-ethyl-2-thiobarbituric acid used in above example was prepared as follows:

18.4 g. (1 mol.+100% excess) of sodium was dissolved in 300 ml. of absolute ethyl alcohol; after cooling this solution to about 60°, 128 g. (1 mol.+100% excess) of ethyl malonate was added with mechanical stirring, followed by 41.6 g. (1 mol.) of ethyl-thiourea. The reaction mixture was heated at steam-bath temperature with stirring for a 6-hour period and without stirring for a further 72 hours. 300 ml. of cold water was then added to the mixture and most of the alcohol was removed by distillation. The residue was treated with 1 liter of cold water and the mixture filtered. This filtrate was then acidified. The product which separated was collected on filter, washed well with water and dried. It was used without further purification. The yield was 89% of theory.

Example 6.—5-[(1-benzyl-2,5-dimethyl-3-pyrryl)methylene]-1-ethyl-2-thiobarbituric acid

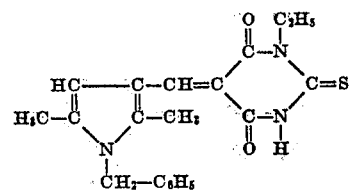

A mixture of 1.7 g. (1 mol.) of 1-ethyl-2-thiobarbituric acid, 2.15 g. (1 mol.) of 1-benzyl-2,5-dimethylpyrrole-3-aldehyde and 50 ml. of absolute ethyl alcohol was refluxed together for 15 minutes. Dye separated from the hot reaction mixture. The yield of crude washed dye obtained was 85% of theory. After two recrystallizations a 62% yield of dye as yellow crystals M. P. 252–254° C. dec. was obtained.

Example 7.—5-[(1,2-dimethyl-3-indolyl)methylene]-1-ethyl-2-thiobarbituric acid

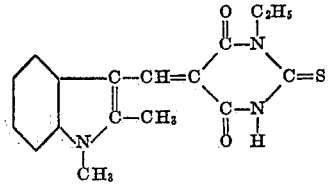

On refluxing a mixture of 1-ethyl-2-thiobarbituric acid (1.7 g., 1 mol.) and 1,2-dimethyl-3-indolealdehyde (1.7 g., 1 mol.) and absolute ethyl alcohol (50 ml.) for a 15-minute period, dye separated from the hot reaction mixture. The yield of crude washed dye was 82% of theory. It was obtained as brownish crystals, M. P. 246–248° C. dec. after two recrystallizations.

Other dyes which can be prepared according to the above general method include those illustrated in the following examples.

Example 8.—5-[(4-carbethoxy-3,5-dimethyl-2-pyrryl)methylene]-1-ethyl-2-thiobarbituric acid

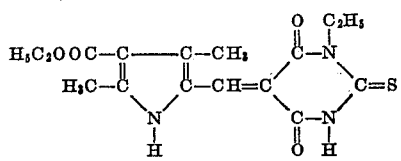

A mixture of 1.7 g. (1 mol.) of 1-ethyl-2-thiobarbituric acid, 1.95 g. (1 mol.) of 4-carbethoxy-3,5-dimethylpyrrole-2-aldehyde [Stern & Klebs—Ann. 500, 91 (1932)] and 50 ml. of absolute ethyl alcohol were refluxed for 15 minutes. A 91% yield of crude, washed dye was obtained. After two recrystallizations it was obtained as yellow crystals, M. P. 273–275° C. dec.

Example 9.—5-[(2,5-dimethyl-1-phenyl-3-pyrryl)methylene]-2-thiobarbituric acid

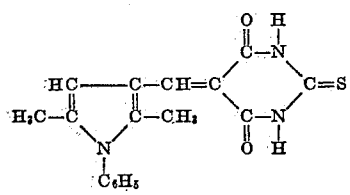

1.45 g. (1 mol.) of 2-thiobarbituric acid, 2 g. (1 mol.) of 2,5-dimethyl-1-phenylpyrrole-3-aldehyde and 50 cc. of absolute ethyl alcohol were refluxed together for a period of fifteen minutes. Dye separated from the hot reaction mixture. Yield of crude well-washed dye was 94 per cent of theoretical. The dye was purified by repeated recrystallizations from pyridinemethyl alcohol mixtures and obtained as orange-yellow crystals, M. P. 264–266° C. This dye gives a yellow alcoholic solution which is bleached by photographic developers.

Example 10.—5-[(1-n-heptyl-2,5-dimethyl-3-pyrryl)methylene]-2-thiobarbituric acid

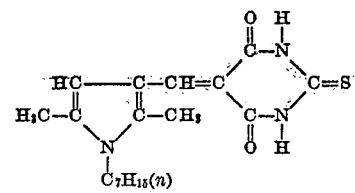

1.45 g. (1 mol.) of thiobarbituric acid, 2.2 g. (1 mol.) of 1-n-heptyl-2,5-dimethylpyrrole-3-aldehyde and 50 cc. of absolute ethyl alcohol were refluxed together for a period of fifteen minutes. Dye separated on chilling. The yield of crude washed dye was 60 per cent of theoretical.

After two recrystallizations from a mixture of pyridine and methyl alcohol, it was obtained as greenish yellow crystals, M. P. 254–256° C. This dye gives a yellow alcoholic solution which is bleached by photographic developers.

*Example 11.—1,3 - diethyl - 5 - [(2,5 - dimethyl - 1 - phenyl-3-pyrryl)methylene]-2-thiobarbituric acid*

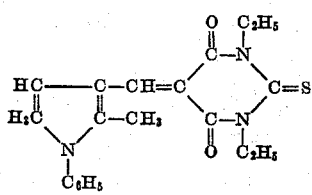

2 g. (1 mol) of 1,3-diethyl-2-thiobarbituric acid, 2 g. (1 mol) of 2,5-dimethyl-1-phenylpyrrole-3-aldehyde and 50 cc. of absolute ethyl alcohol were refluxed together for a period of fifteen minutes. Dye separated on chilling. An 87 per cent yield of well-washed crude dye was obtained. After repeated recrystallizations from a mixture of pyridine and methyl alcohol, the dye was obtained as orange-yellow crystals, M. P. 177–179° C. This dye gives a yellow alcohol solution which is bleached by photographic developers.

*Example 12.—5-[(2,5-dimethyl-1-phenyl-3-pyrryl)methylene] barbituric acid*

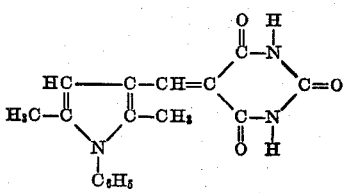

1.3 g. (1 mol) of barbituric acid, 2 g. (1 mol) of 2,5-dimethyl-1-phenylpyrrole-3-aldehyde and 50 cc. of absolute ethyl alcohol were refluxed together for a period of fifteen minutes. Dye separated on chilling. The yield of well-washed crude dye was 97 per cent of theoretical. After two recrystallizations from a pyridine-methyl alcohol mixture, the dye was obtained as yellow crystals, M. P. 246–249° C. This dye gives a yellow alcoholic solution which is bleached by photographic developers.

The intermediates represented by Formula II above can be prepared by condensing a compound selected from those represented by the following general formula:

IV.  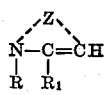

wherein R, $R_1$, and Z have the values set forth above with formamide in the presence of phosphorusoxychloride. See Nenitzeseu et al.—"Bull. Soc. Chim. Romania" 11, 135 (1929), and Brooker & Sprague—"Jour. Am. Chem. Soc." 67, 1869 (1945). The pyrrole bases of Formula IV can be prepared according to the process of Lions et al., "Proc. Royal Soc. New South Wales," 71, 92 (1937). For a general outline of these methods see Brooker et al. U. S. Patent 2,268,798, issued January 6, 1942; Brooker et al. U. S. Patent 2,298,731, issued October 13, 1942; Brooker et al. 2,409,612, issued October 22, 1946; and Sprague et al. U. S. Patent 2,515,905, July 18, 1950.

The intermediates represented by Formula III above can be prepared by condensing a compound selected from those represented by the following general formula V.  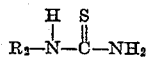

wherein $R_2$ has the values set forth above, with a dialkyl malonate, e. g., diethyl malonate, in the presence of an alkali metal alcoholate, e. g., sodium ethylate. Such a method is described in Example 5 above.

In the above examples the crude dyes were collected on a filter after chilling the reaction mixtures, and the crude dyes were washed with methyl alcohol in each instance. The crude washed dyes were recrystallized by dissolving in pyridine (boiling) and precipitating the chilled solution with methyl alcohol.

A number of the intermediates included within the scope of Formula II above have been previously described in U. S. Patent 2,515,912, issued July 18, 1950, to Van Lare and Brooker.

What I claim as my invention and desire secured by Letters Patent of the United States is:

1. A monomethine dye selected from those represented by the following general formula:

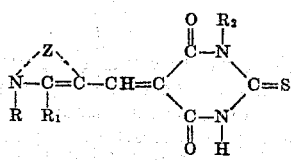

wherein R and $R_2$ each represents a member selected from the group consisting of a primary alkyl group of the formula $C_nH_{2n+1}$ wherein $n$ represents a positive integer of from 1 to 4 and an aryl group of the benzene series, $R_1$ represents a primary alkyl group of the formula $C_mH_{2m+1}$ wherein $m$ represents a positive integer of from 1 to 4, and Z represents the nonmetallic atoms necessary to complete a heterocyclic nucleus of the pyrrole series.

2. A monomethine dye selected from those represented by the following general formula:

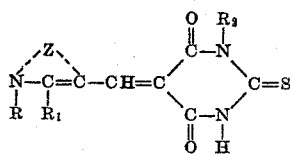

wherein R and $R_2$ each represents an aryl group of the benzene series, $R_1$ represents a primary alkyl group of the formula $C_nH_{2n+1}$ wherein $n$ represents a positive integer of from 1 to 4, Z represents the nonmetallic atoms necessary to complete a heterocyclic nucleus of the pyrrole series.

3. The monomethine dye represented by the following formula:

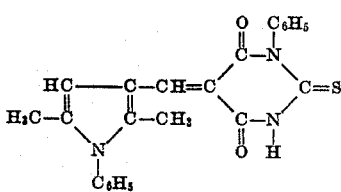

4. A monomethine dye selected from those represented by the following general formula:

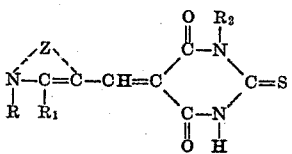

wherein R represents an aryl group of the benzene series, $R_1$ and $R_2$ each represents primary alkyl group of the formula $C_nH_{2n+1}$ wherein $n$ represents a positive integer of from 1 to 4, and Z represents the nonmetallic atoms necessary to complete a heterocyclic nucleus of the pyrrole series.

5. The monomethine dye represented by the following formula:

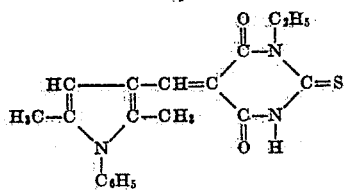

6. A monomethine dye selected from those represented by the following general formula:

wherein R and R₁ each represents a primary alkyl group of the formula $C_nH_{2n+1}$ wherein $n$ represents a positive integer of from 1 to 4, R₂ represents an aryl group of the benzene series, and Z represents the nonmetallic atoms necessary to complete a heterocyclic nucleus of the pyrrole series.

7. The monomethine dye represented by the following formula:

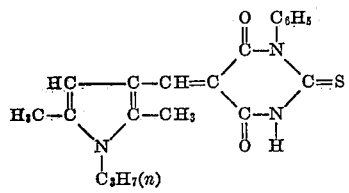

References Cited in the file of this patent

UNITED STATES PATENTS

| | | |
|---|---|---|
| 2,170,805 | Brooker | Aug. 29, 1939 |
| 2,185,182 | Brooker | Jan. 2, 1940 |
| 2,265,907 | Kendall | Dec. 9, 1941 |
| 2,548,571 | Lare | Apr. 10, 1951 |

FOREIGN PATENTS

| | | |
|---|---|---|
| 529,440 | Great Britain | 1940 |
| 562,757 | Great Britain | July 14, 1944 |